United States Patent Office 3,187,770
Patented June 8, 1965

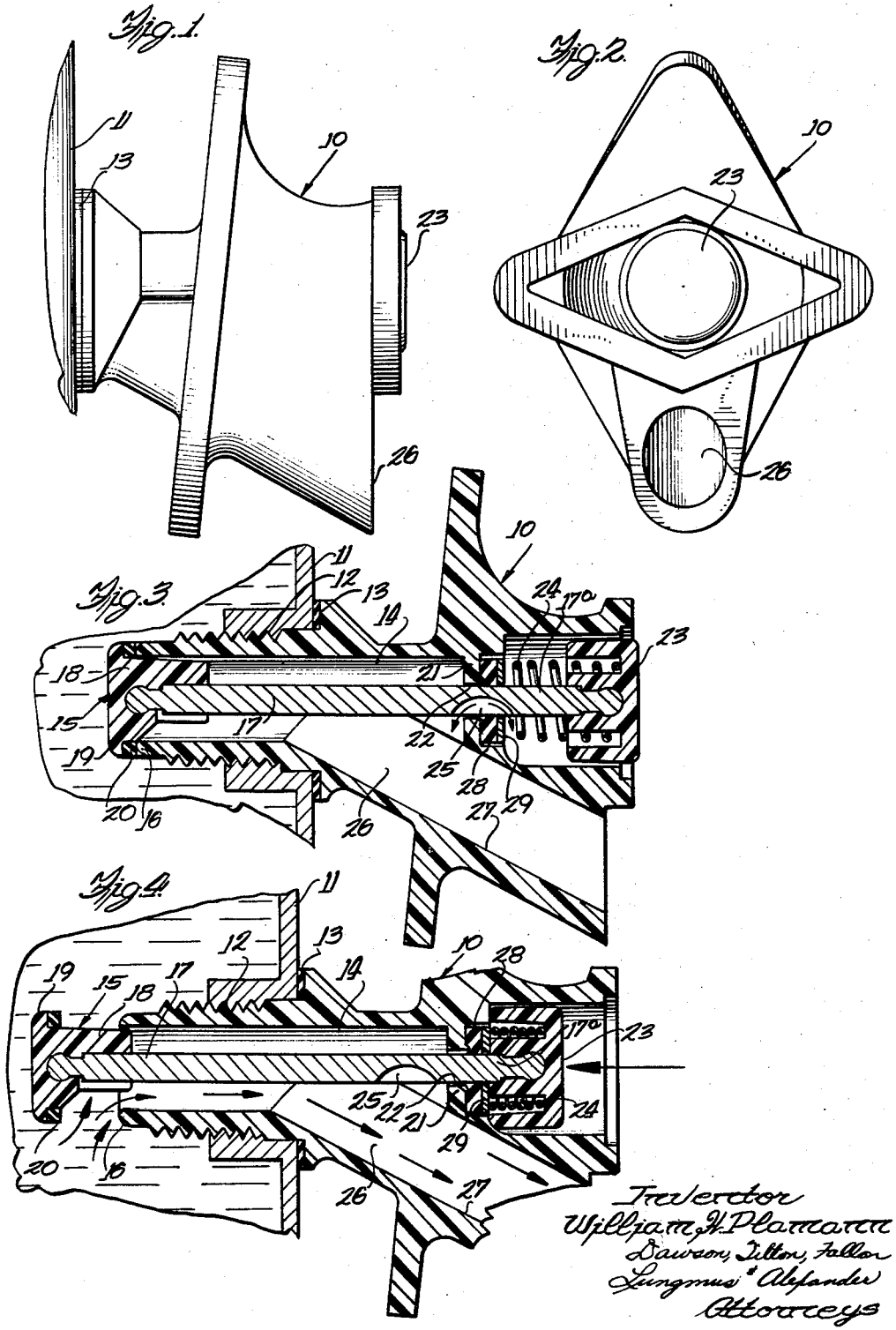

3,187,770
SELF-DRAINING FAUCET FOR A PORTABLE
LIQUID CONTAINER
William H. Plamann, Wichita, Kans., assignor to The
Coleman Company, Inc., Wichita, Kans., a corporation
of Kansas
Filed Oct. 18, 1962, Ser. No. 231,381
1 Claim. (Cl. 137—589)

This invention relates to a self-draining faucet for a portable liquid container. The faucet and valve assembly of this invention have particular application to picnic jugs and the like.

One of the problems in the use of faucets on portable liquid containers is the tendency of the liquid to remain in the passages of the faucet after the flow has been stopped, and eventuallly to drip out of the faucet after the vessel being filled has been removed from under the faucet. The principal object of the present invention is to alleviate this problem, while at the same time providing a faucet which does not leak during use. A more specific object is to provide a self-draining faucet for use on portable liquid containers which empties itself of any liquid within the interior passage immediately after the faucet valve is closed, thereby permitting all of the discharged liquid to be collected in the vessel being filled, and leaving the interior passages of the faucet substantially free of liquid to prevent dripping of the faucet after the vessel is removed. Other objects and advantages are indicated in the following detailed specification.

The faucet and valve assembly of this invention are shown in illustrative embodiments in the accompanying drawing, in which—

FIGURE 1 is a side elevational view of a faucet in which the new combination of the invention is incorporated, the faucet being connected to a portable liquid container;

FIG. 2, a front elevational view of the faucet of FIG. 1;

FIG. 3, a view similar to FIG. 1 but showing the parts in vertical section, the valve being shown in closed position; and FIG. 4, a sectional view like that of FIG. 3 except that the valve is shown in open position.

Looking first at FIGS. 1 and 2, there is shown a faucet designated generally by the number 10 which extends horizontally, and is mounted in the side wall of a portable liquid container 11. As shown in FIGS. 3 and 4, a threaded connection can be provided at 12 between the container wall 11 and the outside of faucet 10, and a gasket 13 can be provided for assuring a liquid-tight seal.

As shown more clearly in FIGS. 3 and 4, the faucet 10 includes a horizontally-extending internal passage 14 for the flow of liquid from the inner end portion to the outer end portion of the faucet. The inner end portion is provided with valve means designated generally by the number 15 for opening passage 14 to the outflow of liquid. In the illustration given, this valve means includes a valve seat 16 provided by the inner end of faucet 10 around the entrance to passage 14. The valve means also includes a valve stem 17 which extends through passage 14 to its inner end. An end plug 18 is mounted on the inner end of the valve stem 17 by a ball and socket connection, and the inner end of plug 18 provides an outwardly-extending annular portion 19 for retaining a sealing gasket 20 which is arranged to cooperate with valve seat 16 to close the valve.

The closed position of valve means 15 is shown in FIG. 3, while the extreme open position is shown in FIG. 4. It will be noted that valve 15 is opened by valve stem 17 being moved inwardly. It will be understood that the construction of the valve means 15 can be varied without departing from the present invention, which is characterized by the cooperative relation of the elements which will now be described.

According to the present invention, a wall 21 extends across the outer end of the passage 14, as shown in FIGS. 3 and 4. In the illustration given, wall 21 is formed integrally with faucet 10 and extends in a generally vertical plane. Wall 21 provides an opening 22 which extends therethrough and slidably receives valve stem 17. Valve stem 17 includes an actuating end 17a which projects outwardly from wall 21, thereby permitting valve means 15 to be operated from outside of faucet 10. In the illustration given, the outer end of the valve stem is connected by a ball and socket joint to an operating button 23 by means of which the valve stem 17 can be moved inwardly to open the valve means 15, as indicated in FIG. 4. There is also preferably provided a spring means such as compression spring 24 for biasing valve stem 17 to its extreme outward position, valve 15 being closed as shown in FIG. 3. In the illustration given, compression spring 24 is interposed between wall 21 and the operating button 23.

To achieve the results of the present invention, it is essential to provide valve stem 17 with an axially-extending recess 25 which is positioned adjacent wall 21 when valve 15 is in closed position, while being within passage 14 when the valve is in open position, as respectively shown in FIGS. 3 and 4. In the position of FIG. 3, it will be noted that recess 25 provides communication between the outside of faucet 10 and internal passage 14. The purpose of this will subsequently be described.

Faucet 10 also includes a discharge outlet 26 which extends downwardly from the lower side of passage 14 inwardly of wall 21. Preferably, discharge outlet 26 is provided with a downwardly and outwardly inclined lower wall 27, as shown in FIGS. 3 and 4.

There is also preferably provided sealing gasket means which cooperates with valve stem 17, or, more particularly, with outwardly projecting portion 17a thereof, and with wall 21 to maintain a liquid-tight seal around the outside of wall opening 22 when valve 15 is in the open position, while permitting recess 25 to provide an air passage from the outside to the inside of the faucet when valve 15 is closed. In the illustration given, the sealing gasket means comprises a ring 28 of flexible resilient material such as synthetic rubber. Ring 28 is slidably received on the projecting end portion 17a of the valve stem, as shown in FIGS. 3 and 4. The opening through the center of ring 28 is dimensioned so that the ring is snugly received on the projecting end 17a, thereby providing a liquid-tight seal between ring 28 and stem portion 17a when valve 15 is in open position, as shown in FIG. 4.

The inside face of ring 28 bears against the outer face of wall 21, and provides a seal therewith. If desired, as shown, complementary recesses and depressions can be provided in these surfaces to improve the sealing engagement. The construction shown is also desirable to provide a washer 29 which is loosely received on stem portion 17a outwardly of gasket ring 28. The inner end of compression spring 24 bears against washer 29, which in turn bears against gasket 28. This construction assures that gasket 28 will be maintained in sealing engagement with the outer surface of wall 21. However, if desired, the gasket means can be maintained in engagement with wall 21 by other means, such as uniting the gasket to the wall.

*Operation*

The operation of the self-draining faucet of this invention will now be described in greater detail. The valve 15 is opened by depressing operating button 23, as shown in FIG. 4. This permits the liquid to flow outwardly through passage 14 and to be discharged through the downwardly inclined discharge spout 26. The vessel in which the liquid is being collected will be held beneath the lower end of discharge spout 26. During the outflow of liquid, no leaking can occur through the opening 22 around valve stem 17. As shown in FIG. 4, the recess 25 is within the passage 14, and opening 22 is closed by means of gasket 28, which seals to the outside surface of wall 21 and to the projecting portion 17a of the valve stem. When the vessel has been filled to the desired level, button 23 will be released, and the valve will be moved to the closed position of FIG. 3 by the action of compression spring 24. In this position, some liquid would be temporarily trapped within passage 14, and this would cause subsequent dripping of the faucet. With the present construction, however, this is avoided. As soon as the valve returns to the closed position, the recess 25 provides an air passage into passage 14 at a higher level than discharge outlet 26. To accomplish this result, it is preferred that recess 25 have a greater axial extent than the combined axial extent of wall 21, gasket 28, and washer 29. The desired relation of these parts is shown most clearly in FIG. 3. With this construction, air will enter through passage 25 immediately upon the closing of the valve, and this will cause the remaining liquid within passage 14 to flow downwardly through outlet 26 into the vessel before the person filling the vessel has an opportunity to remove it. The downward inclination of the bottom wall 27 in the discharge spout assists in this rapid clearing action.

While, in the foregoing specification, this invention has been described in relation to a specific embodiment thereof, and many details have been set forth for purpose of illustration, it will be apparent to those skilled in the art that the invention is susceptible to other embodiments and that many of the details described herein can be varied considerably without departing from the basic principles of the invention.

I claim:

A faucet and valve assembly for a portable liquid container, comprising a horizontally-extending faucet having an internal passage for the flow of liquid from the inner end portion to the outer end portion thereof, said outer portion providing a discharge outlet extending downwardly from the lower side of said internal passage, a valve stem extending through said internal passage from said outer to said inner faucet portion, valve means mounted on the inner end of said valve stem for opening said passage to the outflow of liquid when said valve stem is moved inwardly, said faucet outer portion providing a vertically-extending wall having an opening therein, the outer portion of said valve stem being slidably received in said opening and projecting therethrough to the exterior of said faucet, gasket sealing means slidably received on the projecting end of said valve stem and bearing against the outside of said faucet wall, spring means biasing said valve to closed position with the projecting end of said valve stem fully extended, said spring means also urging said gasket sealing means against the outside surface of said wall, said valve stem having a recess in one side thereof of greater axial extent than said wall and gasket means, said recess being adjacent said wall and gasket means when said valve is in closed position and providing an air passage from the outside to the inside of said faucet, said recess being wholly within said passage when said valve is open, and said gasket means cooperating with said valve stem and said wall to provide a liquid-tight seal while liquid is being discharged through said internal passage until said valve is closed.

References Cited by the Examiner
UNITED STATES PATENTS

| | | | |
|---|---|---|---|
| 725,494 | 4/03 | Setzler | 137—596 XR |
| 737,300 | 8/03 | Turajski | 137—589 |
| 820,178 | 5/06 | Buerkle | 137—625.26 |
| 1,241,989 | 10/17 | Kelly | 137—596 XR |
| 1,465,540 | 8/23 | Brandriff | 137—596 |
| 2,131,785 | 10/38 | Ribble | 137—596 XR |
| 2,564,686 | 8/51 | Gray | 137—625.26 |
| 2,939,611 | 6/60 | Nebinger | 222—484 XR |

M. CARY NELSON, *Primary Examiner.*